US006659394B1

United States Patent
Shenk

(10) Patent No.: US 6,659,394 B1
(45) Date of Patent: Dec. 9, 2003

(54) COMPOUND TILTING WING FOR HIGH LIFT STABILITY AND CONTROL OF AIRCRAFT

(75) Inventor: Barth W. Shenk, Bellbrook, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 09/871,261

(22) Filed: May 31, 2001

Related U.S. Application Data

(60) Provisional application No. 60/208,656, filed on May 31, 2000.

(51) Int. Cl.[7] .............................................. B64C 27/22
(52) U.S. Cl. ..................... 244/7 C; 244/75 R; 244/36; 244/12.4
(58) Field of Search ...................... 244/7 C, 56, 214, 244/215, 12.4, 8, 66, 198, 130, 36, 75 R

(56) References Cited

U.S. PATENT DOCUMENTS

| 1,858,259 A | * | 5/1932 | Alfaro | 244/7 C |
|---|---|---|---|---|
| 2,459,009 A | * | 1/1949 | Wallis | 244/36 |
| 3,107,882 A | * | 10/1963 | Matteson et al. | 244/7 C |
| 3,136,499 A | * | 6/1964 | Kessler | 244/7 C |
| 3,572,612 A | | 3/1971 | Irbitis | 244/7 |
| 3,666,209 A | | 5/1972 | Taylor | 244/7 C |
| 4,460,138 A | * | 7/1984 | Sankrithi | 244/215 |
| 4,553,721 A | * | 11/1985 | Jorgensen | 244/214 |
| 5,046,684 A | | 9/1991 | Wolkovitch | 244/7 A |
| 5,054,716 A | * | 10/1991 | Wilson | 244/56 |
| 5,405,105 A | * | 4/1995 | Kress | 244/12.4 |
| 5,765,783 A | * | 6/1998 | Albion | 244/7 C |
| 5,899,410 A | | 5/1999 | Garrett | 244/45 R |
| 6,276,633 B1 | * | 8/2001 | Balayn et al. | 244/7 C |

* cited by examiner

Primary Examiner—Michael J. Carone
Assistant Examiner—L. Semunegus
(74) Attorney, Agent, or Firm—Bobby D. Scearce; Thomas L. Kundert

(57) ABSTRACT

An aircraft including a fuselage, a compound tilting wing (CTW) and aircraft engines mounted on the aircraft. The CTW includes a leading edge wing portion and a tilting main wing portion. The leading edge wing portion and the tilting main wing portion each include a leading edge, a trailing edge, a chord, a lower surface and an upper surface. The tilting main wing portion is pivotally mounted on the fuselage for rotation from a cruise flight position to various low flight speed positions. In the cruise flight position, the tilting main wing portion fits conformably with the leading edge wing portion forming an aerodynamically single wing. In one embodiment, two aircraft engines are mounted on a fixed leading edge wing portion and two aircraft engines are mounted on the tilting main wing portion.

6 Claims, 3 Drawing Sheets

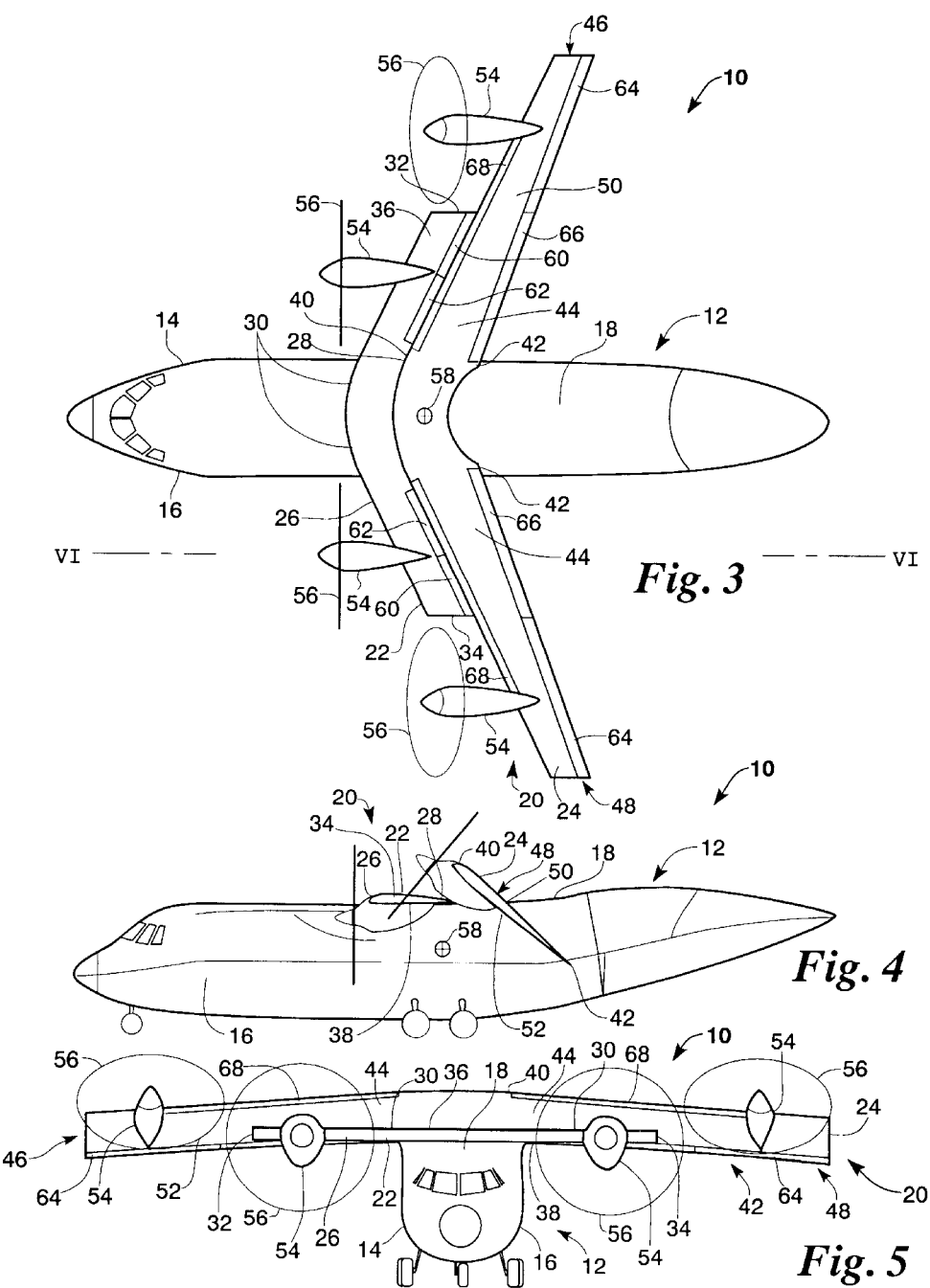

COMPOUND TILTING WING FOR HIGH LIFT STABILITY AND CONTROL OF AIRCRAFT

CROSS-REFERENCE TO RELATED APPLICATION

This application claims priority of the filing date of Provisional Application Ser. No. 60/208,656 filed May 31, 2000, the entire contents of which are incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The present invention relates to a tilting wing aircraft. More particularly, the invention relates to a compound tilting wing aircraft.

Several aircraft use tilting wing configurations to maximize the use of the wing surface for lift generation. Such configurations typically are combined with separate longitudinal and lateral control surfaces (tail) and/or control devices mounted separately on the aircraft to provide rotational control about the principle axes of flight. Rotational control (pitch and yaw) is most critical when the center-of-rotation is expected to vary appreciably, or during low airspeed flight e.g. conventional takeoff and landing (CTOL), short takeoff and landing (STOL) and vertical takeoff and landing (VTOL). For STOL and VTOL conditions, conventional tilting wing configurations derive pitch and yaw control power through large vertical and horizontal tail surfaces, tail rotors, or a combination of the two. The requirement of conventional STOL/VTOL tail aft aircraft configurations to have an out-sized empennage (horizontal and vertical tail) and/or a tail rotor system used only during low airspeed flight conditions is due to the high lift generated during such conditions creating large, negative downwash angles at the horizontal tail. The downwash tends to destabilize such configurations in pitch. Additionally, such configurations incur substantial weight and drag penalties, which translate into reduced payload or cruise performance, as compared to CTOL configurations. Further, the additional control devices increase cost due to mechanical complexity, construction and maintenance.

Therefore, there exists a need in the art for a tilting wing configuration which maximizes control power and lift for a fixed wing area while reducing vehicle drag, weight penalties and costs due to mechanical complexity, maintenance, and construction.

SUMMARY OF THE INVENTION

The principal object of the present invention is to provide an aircraft with a compound tilting wing (CTW), which maximizes control power and lift for a fixed wing area while reducing vehicle drag and weight penalties.

According to one aspect of the invention, the invention is an aircraft including a fuselage, a CTW and aircraft engines mounted on the aircraft.

According to another aspect of the invention, the CTW includes a leading edge wing portion and a tilting main wing portion. The leading edge wing portion and the tilting main wing portion each include a leading edge, a trailing edge, a chord, a lower surface and an upper surface.

According to yet another aspect of the invention, the tilting main wing portion fits conformably with the leading edge wing portion forming an aerodynamically single wing in a cruise flight position.

According to another aspect of the invention, the tilting main wing portion may be rotated from the cruise flight position to various low airspeed flight positions including a position nearly perpendicular to the upper surface of the fuselage such that stabilizing center of gravity travel augments a pitch control authority.

BRIEF DESCRIPTION OF THE DRAWINGS

These and further features of the present invention will be apparent with reference to the following description and drawings, wherein:

FIG. 3 is a top view of the embodiment of FIG. 1;

FIG. 4 is a side view of the embodiment of FIG. 2;

FIG. 5 is a front view of the embodiment of FIG. 2; and

FIG. 6a shows the tilting main wing portion in a cruise flight position and FIG. 6b shows the tilting main wing portion in a low airspeed flight position.

DETAILED DESCRIPTION OF THE INVENTION

Figure 1:
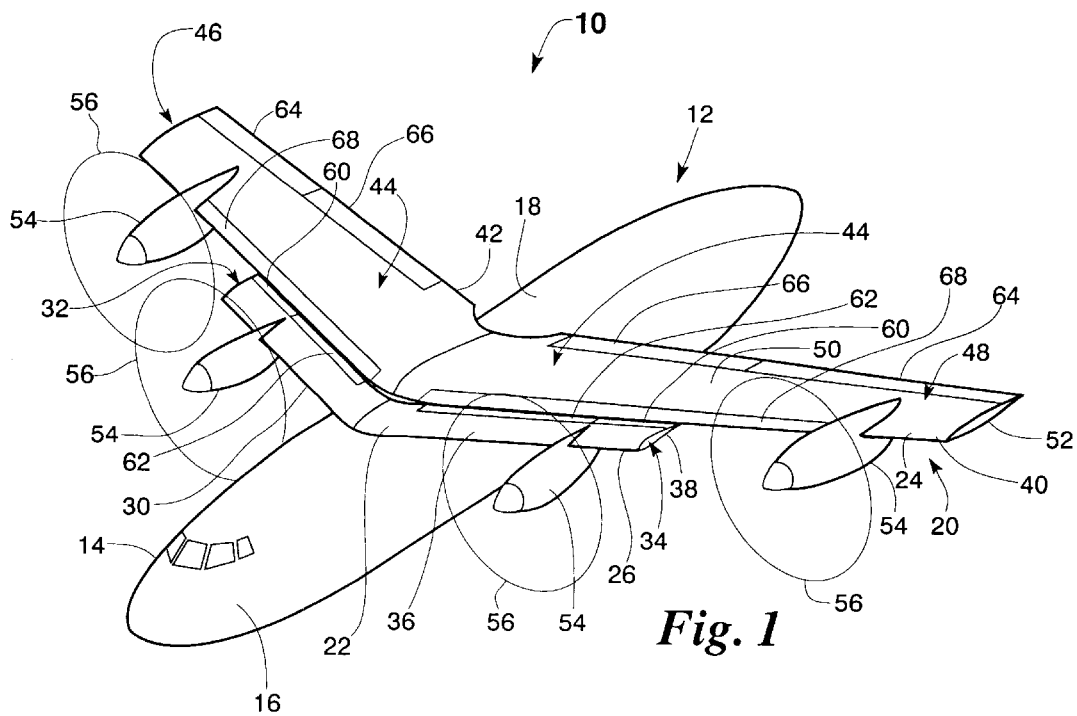
FIG. 1 is a perspective view of an embodiment of the compound tilting wing aircraft of the invention with the tilting main wing portion rotated to a cruise flight position.
Figure 2:
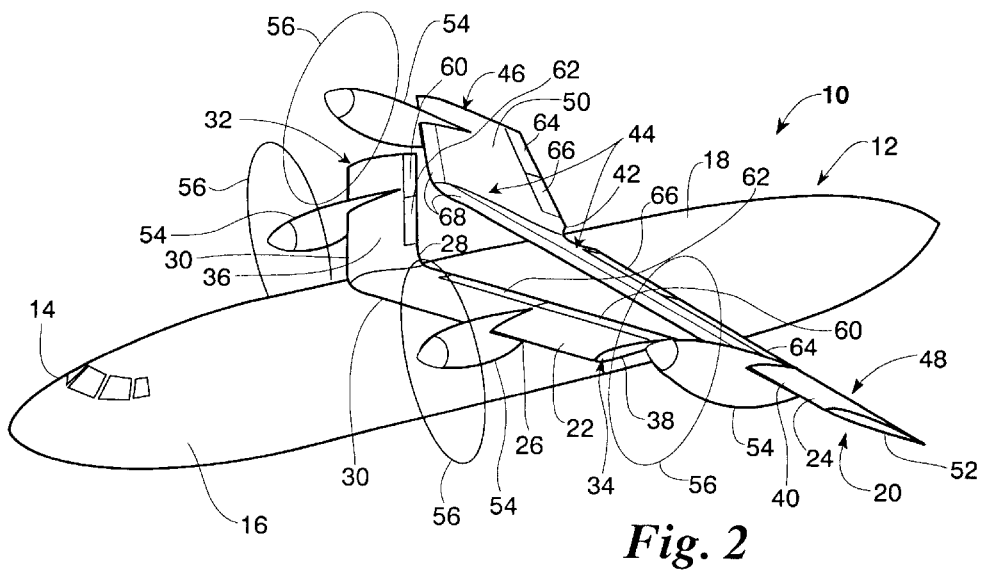
FIG. 2 is a perspective view of the embodiment of FIG. 1, with the tilting main wing portion rotated to a low airspeed flight position.

In the detailed description that follows, identical components have been given the same reference numerals. To illustrate the present invention in a clear and concise manner, the drawings may not necessarily be to scale and certain features may be shown in a partial schematic format.

The compound tilting wing (CTW) aircraft 10 of the invention, shown in FIGS. 1–5 has a fuselage 12 having sides 14 and 16 and an upper surface 18. The CTW aircraft has a compound tilting wing (CTW) 20 comprising a leading edge wing portion (sponson) 22 and a tilting main wing portion 24. The leading edge wing portion 22 having a leading edge 26, a trailing edge 28, an inboard area 30 adjacent the upper surface 18 of the fuselage 12, spaced opposite end tip areas 32 and 34, an upper surface 36 and a lower surface 38. The tilting main wing portion 24 having a leading edge 40, a trailing edge 42, an inboard area 44 adjacent the upper surface 18 of the fuselage 12, spaced opposite end tip areas 46 and 48, an upper surface 50 and a lower surface 52.

Aircraft engines 54 and propeller assemblies 56 of any suitable known type are mounted on the CTW 20. It should be understood that the aircraft engines might be mounted on the fuselage. It should be further understood that the aircraft engines need not include a propeller assembly but may be turbofan engines, turbojet engines or the like. In FIG. 1, the embodiment is shown with four aircraft engines 54 and four propeller assemblies 56. Two of the aircraft engines 54 are mounted to the leading edge 26 of the leading edge wing portion 22 and the other two aircraft engines 54 are mounted to the leading edge 40 near the end tip areas 46 and 48 of the tilting main wing portion 24. The aircraft engines 54 extend forward of the leading edges 26, 40 of the leading edge wing portion 22 and the tilting main wing portion 24, respectively.

Although, tilting main wing portion 24 is shown as a single wing it could be two wings extending from the fuselage 12. One wing extending from the vertical center of the fuselage 12 to one of the tip end areas 46 and the other wing extending from the vertical center to the other of the tip end areas 48. Each wing having a span essentially extending from the corresponding side 14 and 16, respectively, of said fuselage and each having an aspect ratio considerably smaller than the aspect ratio of the tilting main wing portion 24 as a whole. The reduction in the aspect ratio greatly increases the angle of attack attainable without separation during the movement of the tilting main wing portion 24 from its cruise flight position.

The aircraft has a center of gravity 58 and the CTW 20 with the engines mounted thereon can be placed such that a net destabilizing fin effect of the engines mounted on the leading edge wing portion may be reduced by a more stabilizing fin effect of the engines mounted on the tilting main wing portion. In the embodiment shown in FIGS. 1–5, the wing is aft swept 25° in a manner whereby the two aircraft engines 54 mounted on the tilting main wing portion 24 provide a more stabilizing fin effect since the fins (propellers) of the two engines are behind the center of gravity when the CTW 20 is in, or close to, its maximum low airspeed flight position, as shown in FIG. 4. In an exemplary embodiment, the leading edge wing portion 22 and the tilting main wing portion 24 are straight-tapered with a constant NACA 4412 airfoil section, as shown in FIGS. 6a and 6b.

The aircraft 10 includes a flight control surface suite. The suite includes one outboard elevon 60 and one inboard elevon 62 on each semi-span of the leading edge wing portion 22. The tilting main wing portion 24 includes one outboard elevon 64 and one inboard elevon 66 as well as a leading edge slat 68 on each semi-span. The elevons are single-slotted, non-translating flaps. In one embodiment, the wing planform shape of the CTW 20 may be manipulated to maximize lift and control without adding additional control surface areas such as a conventional aft tail.

Figure 6A:
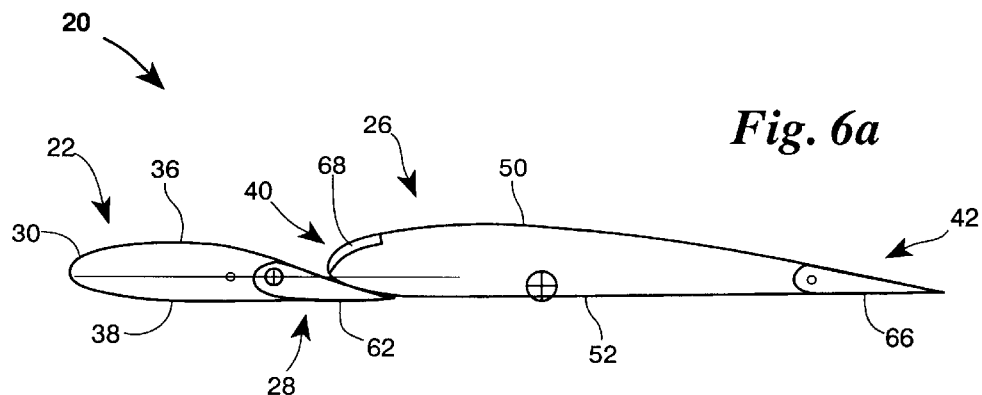
FIGS 6a and 6b show schematic diagrams, on an enlarged scale taken along line VI of FIG. 3, illustrating the CTW of the invention.
Figure 6B:
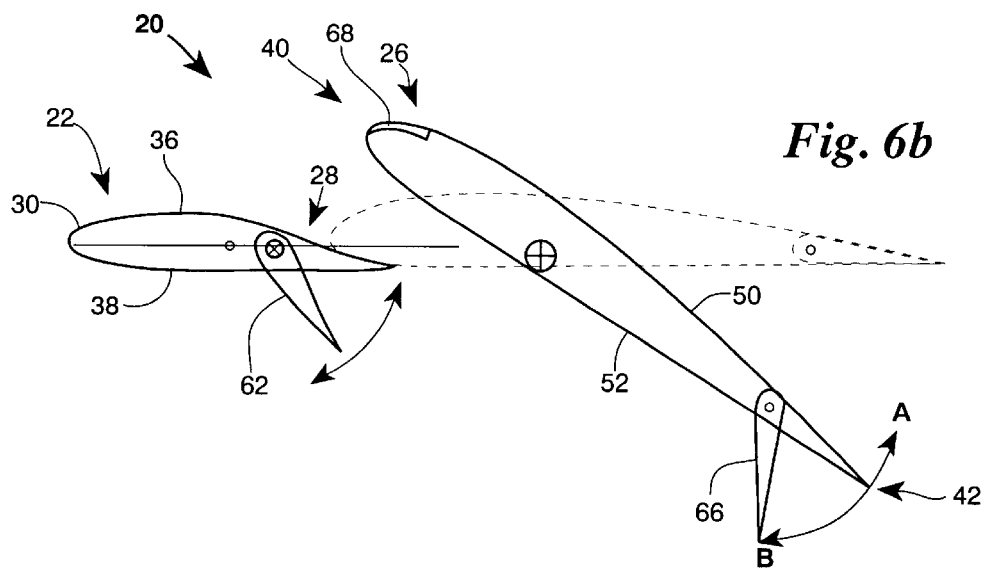

As shown in FIGS. 6a and 6b, each elevon 60, 62, 64 and 68 are mounted for selective movement from substantial colinearity with the chord of the leading edge wing portion 22 and main tilting wing portion 24, respectively to a first angle A of substantially +30° with said chord and substantially +30° with the upper surfaces 36, 50 of the wing portions 22, 24, respectively. Each elevon 60, 62, 64 and 68 also is mounted for selective movement from substantial colinearity with said chord to a second angle B of substantially −30° with said chord and substantially −30° with the lower surfaces 38, 52 of the wing portions 22, 24, respectively.

The tilting main wing portion 24 is pivotally mounted on the fuselage 12 by any known suitable means for rotation from a forward, or cruise flight, position in which the tilting main wing portion 24 fits conformably with the leading edge wing portion forming a single wing aerodynamically, as shown in FIG. 1. The tilting main wing portion 24 may be rotated from the cruise flight position through various low airspeed flight positions including a low airspeed flight position in which the tilting main wing portion 24 is substantially perpendicular to said upper surface 18 of said fuselage 12. One such low airspeed flight position is shown in FIG. 3. In one embodiment the various low airspeed flight positions are fixed positions. The various low airspeed flight positions maximize lift for a given wing area.

In one exemplary embodiment, the leading edge wing portion is fixed. Such a configuration, by not tilting the fixed leading edge portion with engines mounted thereon, augments the aircrafts pitch control authority by stabilizing cg travel.

The CTW aircraft is rotationally controlled by the flight control surface suite providing pitch and yaw control. Angular deflection of the outboard elevons 60, 64 and inboard elevons 62, 66 in the slipstream of the propellers 56 located on the leading edge wing portion 22 and the main tilting wing portion 24, produces fore and aft forces above the center of gravity 58 thereby producing pitch control moments of said wing tip areas. Differential deflection of the outboard elevons 60, 64 and inboard elevons 62, 66 in the slipstream of the propellers 56 located on the leading edge wing portion 22 and the main tilting wing portion 24, where one of said wing tips is up and the other is down, produces yaw control moments at angles when the main tilting wing portion 24 is in and close to its maximum low airspeed flight position, shown by broken lines and solid lines in FIG. 6b, and at low speeds, and also produces roll control at angles when the main tilting wing portion 24 is in and close to its forward flight position, shown by solid lines in FIG. 6a, and at higher speeds. It should be understood that those skilled in the art may chose to include a rudder to effectuate yaw control, but the size requirements of such rudder will be reduced in comparison to conventional. configurations. It should be further understood that the flight control surface suite could provided the pitch and yaw control eliminating the need for a separate tail.

For engine out considerations, the CTW would feature more cross shafting than the basic configuration, since the engines are not collinear. A cross shaft connecting the sponson-mounted engines with either operate separately or be connected to the main wing cross shaft with a complex, heavy, transverse gearing system.

The CTW configuration invention described herein offers several advantages over a basic tilting wing: extensive allowable cg travel, improved lift per unit thrust, superior usable lift per unit wing area, and a more robust STOL flight envelope. It can also be configured to provide a means of improving lateral-directional stability.

Although particular embodiments of the invention have been described in detail, it is understood that the invention is not limited correspondingly in scope, but includes all changes, modifications and equivalents coming within the spirit and terms of the claims appended hereto.

I claim:
1. A tailless aircraft comprising:
   (a) a fuselage with sides and an upper surface;
   (b) a compound tilting wing (CTW), having a fixed leading edge wing portion and a tilting main wing portion, wherein the leading edge wing portion and the tilting main wing portion each have a separate leading edge, a trailing edge, a chord, a lower surface and an upper surface; and
   (c) aircraft engines mounted on the aircraft including, at least four engines with two engines mounted on the fixed leading edge wing portion and two engines mounted on the tilting main wing portion.
2. The aircraft according to claim 1, including a cross shaft connecting said aircraft engines.
3. The aircraft according to claim 1, including a first cross shaft connecting the aircraft engines mounted on the fixed leading edge wing portion and a second cross shaft connecting the aircraft engines mounted on the tilting main wing portion.

4. The aircraft according to claim 3, wherein the first cross shaft is connected to the second cross shaft.

5. The aircraft according to claim 1, includes:
 a means for increasing directional stability by allowing the CTW to be placed such that a net destabilizing fin effect of the engines mounted on the fixed leading edge wing portion may be reduced by a more stabilizing fin effect of the engines mounted on the tilting main wing portion.

6. The aircraft according to claim 5, wherein the means for increasing directional stability includes sweeping the CTW such that a net destabilizing fin effect of the engines mounted on the fixed leading edge wing portion may be reduced by a more stabilizing fin effect of the engines mounted on the tilting main wing portion.

* * * * *